(12) United States Patent
Wirt et al.

(10) Patent No.: US 7,638,107 B1
(45) Date of Patent: Dec. 29, 2009

(54) MULTI-BED SELECTIVE CATALYTIC REDUCTION SYSTEM

(75) Inventors: Jeffrey Philip Wirt, Tulsa, OK (US); Dan W. Ott, Spring City, PA (US); Brian James Duck, Tulsa, OK (US)

(73) Assignee: Callidus Technologies, LLC, Tulsa, OK (US)

( * ) Notice: Subject to any disclaimer, the term of this patent is extended or adjusted under 35 U.S.C. 154(b) by 50 days.

(21) Appl. No.: 12/137,302

(22) Filed: Jun. 11, 2008

(51) Int. Cl.
*B01D 53/56* (2006.01)
*B01D 53/62* (2006.01)
*B01D 53/86* (2006.01)
*B01D 53/90* (2006.01)

(52) U.S. Cl. .................... 423/239.1; 423/246; 423/247; 422/168; 422/169; 422/170; 422/171; 422/172; 422/177; 422/180

(58) Field of Classification Search .............. 423/239.1, 423/246, 247; 422/168–172, 177, 180
See application file for complete search history.

(56) References Cited

U.S. PATENT DOCUMENTS

| | | | |
|---|---|---|---|
| 4,302,431 A | * | 11/1981 | Atsukawa et al. ........ 423/239.1 |
| 4,981,660 A | | 1/1991 | Leach |
| 5,024,981 A | | 6/1991 | Speronello et al. |
| 5,057,293 A | | 10/1991 | Epperly et al. |
| 5,296,206 A | | 3/1994 | Cho et al. |
| 6,315,969 B1 | | 11/2001 | Yoshida |
| 7,146,802 B2 | | 12/2006 | Lee |

* cited by examiner

*Primary Examiner*—Timothy C Vanoy
(74) *Attorney, Agent, or Firm*—Head, Johnson & Kachigian, PC

(57) ABSTRACT

A multi-bed selective catalytic reduction system comprising a gas input duct, a first ammonia injection grid assembly located downstream from the gas input duct, a first selective catalytic reduction catalyst assembly located downstream from the first ammonia injection grid assembly, a second ammonia injection grid assembly located downstream from the first selective catalytic reduction catalyst assembly, a second selective catalytic reduction catalyst assembly located downstream from the second ammonia injection grid assembly, and an exhaust stack located downstream from the second selective catalytic reduction catalyst assembly. By passing a combustion waste stream through two sets of ammonia injection grid assemblies and selective catalytic reduction catalyst assemblies, the multi-bed selective catalytic reduction system removes more nitrogen oxide emissions from the waste stream, uses less ammonia to do so, and results in less ammonia emissions than systems with only one ammonia injection grid assembly and selective catalytic reduction catalyst assembly.

20 Claims, 3 Drawing Sheets

MULTI-BED SELECTIVE CATALYTIC REDUCTION SYSTEM

FIELD OF THE INVENTION

This invention relates generally to removal of toxic elements from combustion waste streams, and more particularly to removal of nitrogen oxide from combustion waste streams using two sets of ammonia injection grids and selective catalytic reduction catalysts.

DESCRIPTION OF THE RELATED ART

Waste streams produced from combustion, such as that produced by burning gas, coal, oil, or other carbon-based fuel sources in combustion turbine engines or for other similar uses, typically contain toxic elements, including carbon monoxide (CO) and nitrogen oxide ($NO_x$). Releasing such combustion waste streams without removing these toxic elements is bad for the environment. Additionally, many places have regulations or laws prohibiting such release. The extent to which CO and $NO_x$ may be released into the environment varies widely under these various laws. California, in particular, has a very high standard regarding such emissions. Therefore, producers of such combustion waste streams frequently must process such waste streams to reduce the amount of toxic elements before releasing the waste streams into the environment.

The use of ammonia injection grids and selective catalytic reduction catalysts to remove $NO_x$ from a combustion waste stream is well known in the art. Lee, U.S. Pat. No. 7,146,802, discloses a method of converting $NO_x$ to nitrogen by a two-stage oxidation catalyst-reduction catalyst SCR reactor, where the two-stage catalytic reactor has an upstream oxidation catalyst stage and a separate downstream reduction reactor stage. Likewise, Yoshida, U.S. Pat. No. 6,315,969, discloses a gas recirculation selective catalytic reduction system, where an injector injects a diluted reducing agent, such as ammonia, into a gas flow, and the gas flow is then subjected to a reduction reaction. Similarly, Cho et al, U.S. Pat. No. 5,296,206, discloses a method of reducing $NO_x$ in flue gas using a reducing agent, preferably aqueous ammonia, where it is then reduced by a catalytic reactor, such as a selective catalytic reduction system. Finally, Leach, U.S. Pat. No. 4,981,660, discloses removing NO and $NO_2$ from a combustion stream by first removing NO using ammonia and then removing $NO_2$ using a catalyst.

The foregoing art, however, cannot remove a high percentage of $NO_x$ from combustion waste streams without requiring the use of extra ammonia, part of which will not be used and will slip past the selective catalytic reduction catalyst and into the environment. This is particularly a problem as environmental standards continue to rise, such as in California. With the current systems, high $NO_x$ conversion and low ammonia slip are not practical, as the distribution of ammonia required to achieve this performance in a single stage is not achievable with the allowable pressure drop for most systems. As the percent of $NO_x$ conversion increases, so does the amount of ammonia slip at an ever-increasing rate. Therefore, for high $NO_x$ conversion, more ammonia must be used and more ammonia will be lost, passing through the selective catalytic reduction catalyst without reacting, and thus exiting into the environment as part of the supposedly treated waste stream.

It is, therefore, desirable to provide a system of removing CO and $NO_x$ from combustion waste streams that results in lower $NO_x$ emissions, lower ammonia emissions, and lower ammonia usage.

SUMMARY OF THE INVENTION

In general, in a first aspect, the present invention relates to a multi-bed selective catalytic reduction system for use in removing toxic elements from combustion waste streams, comprising a gas input duct; a plurality of ammonia injection grid assemblies and a plurality of selective catalytic reduction catalyst assemblies, ordered such that each ammonia injection grid assembly is immediately followed by a selective catalytic reduction catalyst assembly, all located downstream from said gas input duct; and an exhaust stack located downstream from said plurality of ammonia injection grid assemblies and plurality of selective catalytic reduction catalyst assemblies. The plurality of ammonia injection grid assemblies and plurality of selective catalytic reduction catalyst assemblies may be comprised of a first ammonia injection grid assembly located downstream from the gas input duct; a first selective catalytic reduction catalyst assembly located downstream from the first ammonia injection grid assembly; a second ammonia injection grid assembly located downstream from the first selective catalytic reduction catalyst assembly; and a second selective catalytic reduction catalyst assembly located downstream from the second ammonia injection grid assembly.

The multi-bed selective catalytic reduction system may further comprise a distribution grid located between the gas input duct and the plurality of ammonia injection grid assemblies and plurality of selective catalytic reduction catalyst assemblies. Likewise, the multi-bed selective catalytic reduction system may further comprise a silencer in the exhaust stack.

The multi-bed selective catalytic reduction system may further comprise a plurality of air intake ducts located upstream from the plurality of ammonia injection grid assemblies and plurality of selective catalytic reduction catalyst assemblies and the distribution grid, if it is present. There may be a plurality of fans in fluid communication with the plurality of air intake ducts, and there may be a plurality of dampers located adjacent the plurality of air intake ducts.

The multi-bed selective catalytic reduction system may further comprise a carbon monoxide catalyst assembly located downstream from the gas input duct.

The multi-bed selective catalytic reduction system may be used in a method of removing toxic elements from a combustion waste stream, comprising allowing a combustion waste stream comprising one or more toxic elements to enter a multi-bed selective catalytic reduction system; removing toxic elements from said combustion waste stream by passing said combustion waste stream through a first ammonia injection grid assembly and then a first selective catalytic reduction catalyst assembly located within said multi-bed selective catalytic reduction system; removing more toxic elements from said combustion waste stream by passing said combustion waste stream through a second ammonia injection grid assembly and then a second selective catalytic reduction catalyst assembly located within said multi-bed selective catalytic reduction system; and allowing said combustion waste stream to exit said multi-bed selective catalytic reduction system through an exhaust stack.

This method may further comprise axially distributing the combustion waste stream by passing the combustion waste stream through a distribution grid before passing the combustion waste stream through the first ammonia injection grid assembly. It may likewise further comprise adding tempering air to the combustion waste stream prior to passing the combustion waste stream through the first ammonia injection grid assembly and prior to axially distributing the combustion waste stream, if the distribution grid is present, by allowing tempering air to enter the multi-bed selective catalytic reduction system through a plurality of air intake ducts located upstream of the first ammonia injection grid assembly and the distribution grid, if it is present. Furthermore, the method may comprise forcibly adding tempering air to the combustion waste stream through the use of a plurality of fans in fluid communication with the plurality of air intake ducts. Likewise, the method may furthermore comprise controlling the amount of tempering air added to the combustion waste steam through the use of dampers located adjacent the air intake ducts.

The method may further comprise removing carbon monoxide from the combustion waste stream by passing the combustion waste stream through a carbon monoxide catalyst assembly located within the multi-bed selective catalytic reduction system.

Figure 1:
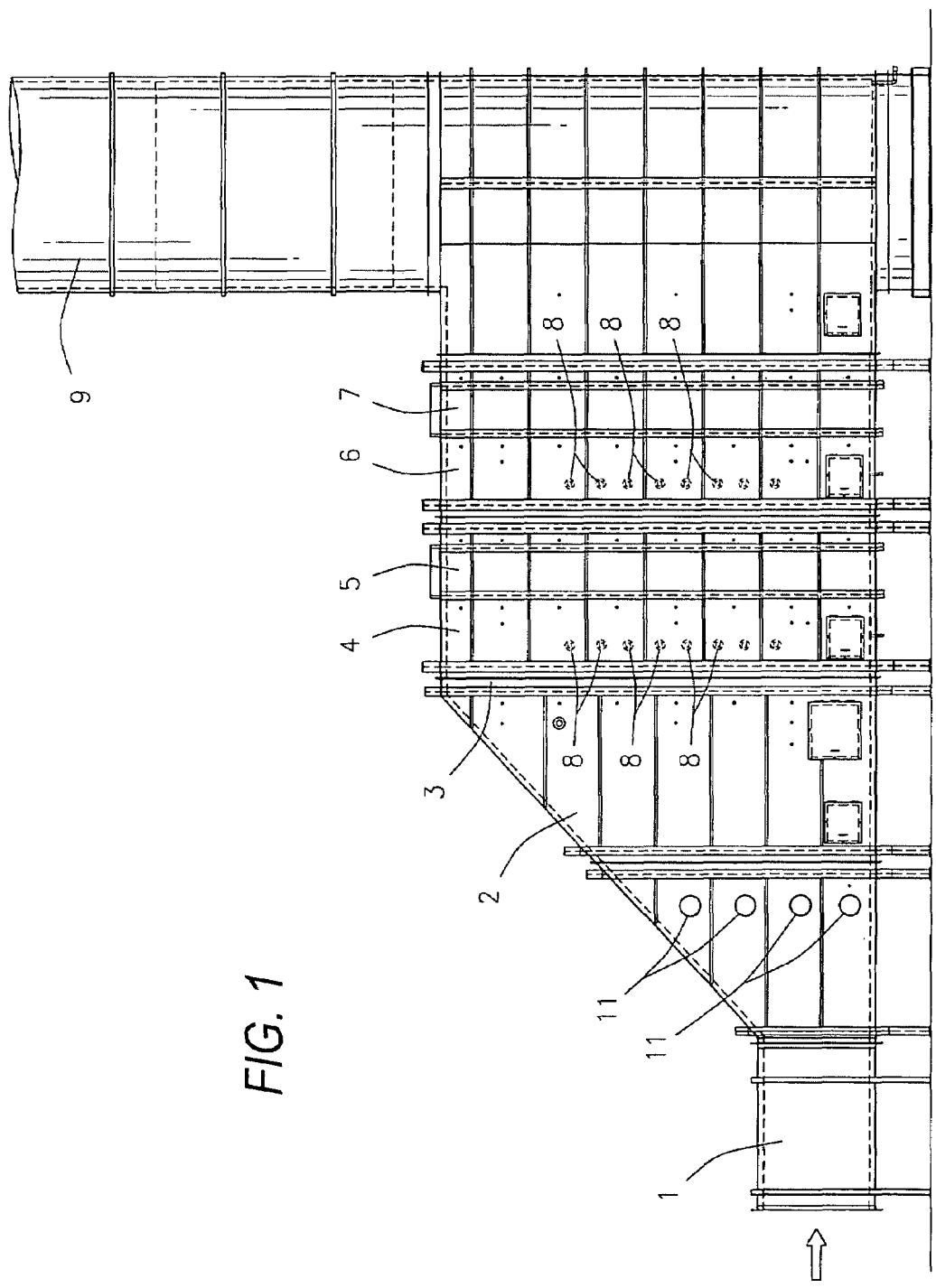
FIG. 1 is an elevation view of the multi-bed selective catalytic reduction system.

Other advantages and features will be apparent from the following description and from the claims.

DETAILED DESCRIPTION OF THE PREFERRED EMBODIMENTS

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

The multi-bed selective catalytic reduction system provides a much-improved method for nitrogen oxide ($NO_x$) reduction from a combustion waste stream. This method utilizes a carbon monoxide (CO) catalyst and multiple ammonia injection grids (AIGs) and selective catalytic reduction (SCR) catalysts in a two-stage system for the reduction of toxic elements present in combustion waste streams, thereby greatly improving the system's efficiency and environmental safety.

Referring to the figures of the drawings, wherein like numerals of reference designate like elements throughout the several views, the multi-bed selective catalytic reduction system has a gas input duct 1, wherein a waste stream from combustion enters the system. Such a waste stream typically has $NO_x$ and CO in such amounts as to make releasing the waste stream into the environment untreated not only bad for the environment but, in many places, illegal. Downstream from the gas input duct 1 may be a distribution grid 2. The distribution grid 2, as is known in the art, axially distributes the waste stream so as to limit the pressure drop on the successive elements.

Downstream from the gas input duct 1 and the distribution grid 2, if it is present, is a CO catalyst assembly 3. The CO catalyst assembly 3 removes CO from the waste stream, as is known in the art. Downstream from the CO catalyst assembly 3 is a first ammonia injection grid assembly 4, followed by a first selective catalytic reduction catalyst assembly 5. The first ammonia injection grid assembly 4 and the first selective catalytic reduction catalyst assembly 5 work in conjunction to remove approximately 70-85% of the $NO_x$ present in the waste stream. Downstream from the first ammonia injection grid assembly 4 and the first selective catalytic reduction catalyst assembly 5 are a second ammonia injection grid assembly 6 and a second selective catalytic reduction catalyst assembly 7. The second ammonia injection grid assembly 6 and the second selective catalytic reduction catalyst assembly 7 likewise work together to remove approximately 70-85% of the $NO_x$ remaining in the waste stream. Thus, having passed through assemblies 4, 5, 6, and 7, the waste stream will have lost as much as 97% of the $NO_x$ with which it entered the multi-bed selective catalytic reduction system. In both the first and second ammonia injection grid assemblies 4 and 6, ammonia is injected through ammonia injection grid headers 8. Either or both of the first and second ammonia injection grid assemblies 4 and 6 may be of the type discussed in the applicants' co-pending application, titled Ammonia Injection Grid for a Selective Catalytic Reduction, Ser. No. 12/137,324, which is fully incorporated by reference herein.

Figure 2:
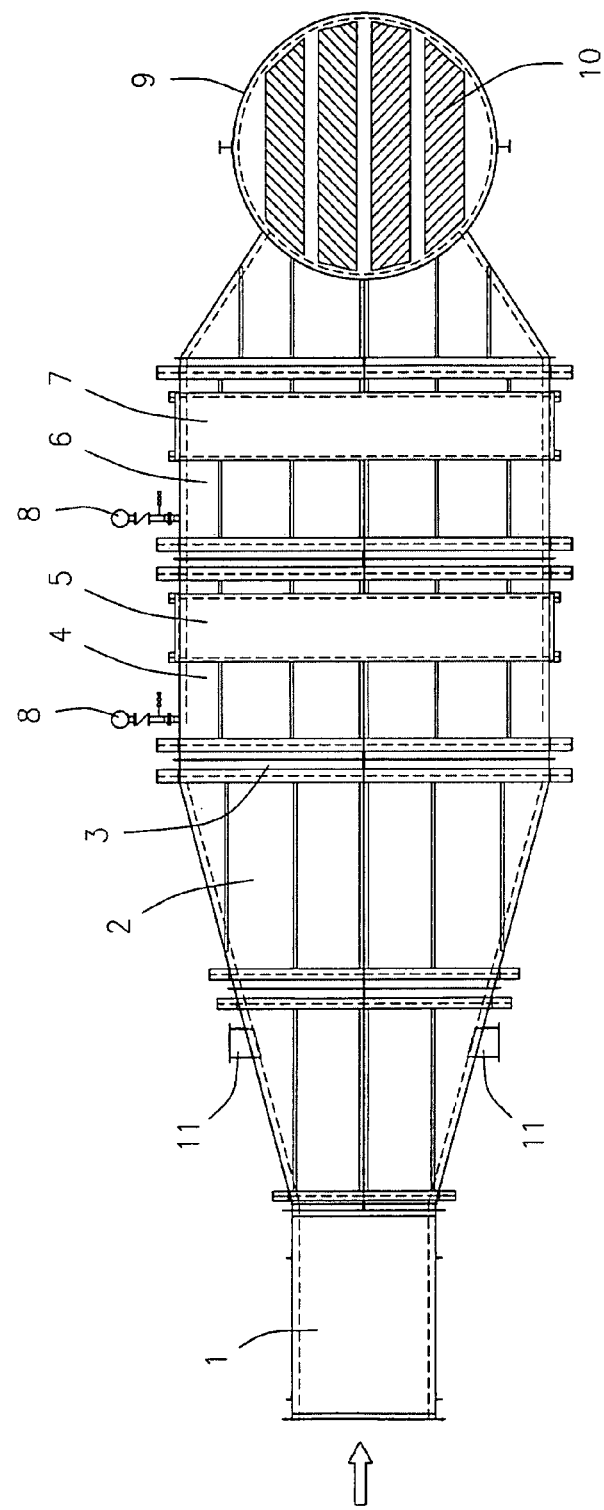
FIG. 2 is a plan view of the multi-bed selective catalytic reduction system with an optional silencer in the exhaust stack.
Figure 3:
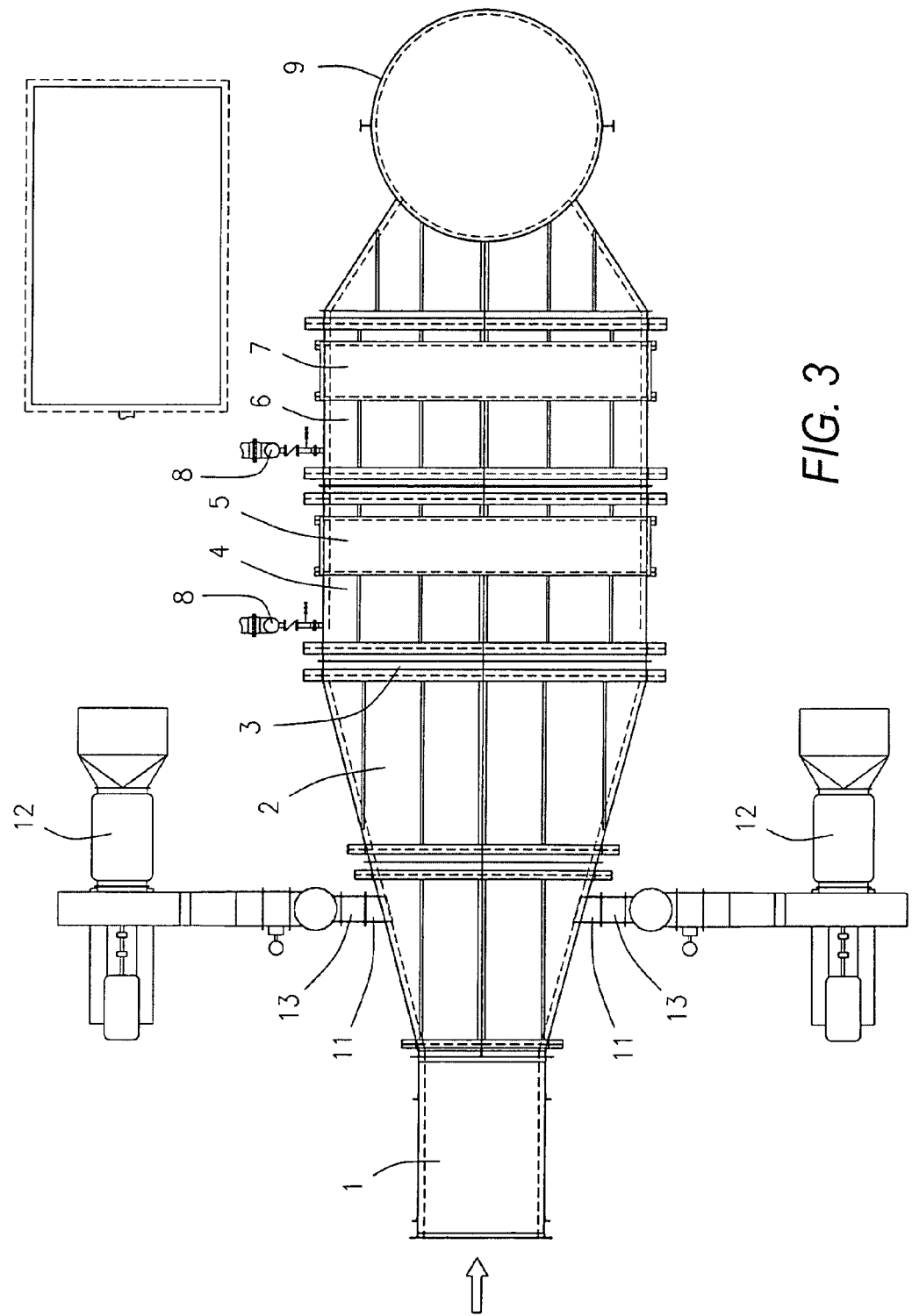
FIG. 3 is a plan view of the multi-bed selective catalytic reduction system with optional tempering air fans.

Downstream from the second selective catalytic reduction catalyst assembly 7 is an exhaust stack 9 whereby the treated waste stream exits the multi-bed selective catalytic reduction system. As seen in FIGS. 1 and 2, the exhaust stack 9 may incorporate a silencer 10. This allows the multi-bed selective catalytic reduction system to be used in locations where sound pollution is a concern.

The multi-bed selective catalytic reduction system may have air intake ducts 11 located downstream from the gas input duct 1 and upstream of the CO catalyst assembly 3 and the distribution grid 2, if it is present. This allows tempering air to be added to the combustion waste stream. Connected to said air intake ducts 11 may be fans 12, and the air flow from the fans 12 may be controlled by dampers 13, which may be located adjacent the air intake ducts 11. The fans 12 allow tempering air to be forcibly added to the combustion waste stream, and the dampers 13 allow a user to control the amount of air allowed to pass through the air intake ducts 11.

The advantages of the multi-bed selective catalytic reduction system over the prior art include, but are not limited to, lower $NO_x$ emissions, lower ammonia emissions, and lower ammonia usage. Specifically, high $NO_x$ conversion and low ammonia slip are not practical with current systems, as the distribution of ammonia required to achieve this performance in a single stage is not achievable with the allowable pressure drop for most systems. In the current systems, as the percent of $NO_x$ conversion increases, so does the amount of ammonia slip at an ever-increasing rate. Therefore, for high $NO_x$ conversion, more ammonia must be used and more ammonia will be lost, passing through the selective catalytic reduction catalyst without reacting, and thus exiting into the environment as part of the supposedly treated waste stream.

The multi-bed selective catalytic reduction system, on the other hand, has a two-stage design creating two separate 70-85% $NO_x$ removal systems, each being quite tolerant to maldistribution of ammonia, flow, and temperature. In other words, the first stage removes 70-85% of the $NO_x$ from the waste stream, and the second stage removes 70-85% of the remaining $NO_x$. Since each stage removes a relatively average percentage of the $NO_x$ in the waste stream, the ammonia slip is very low, sometimes even zero depending on the specific conditions. Such a design can be employed to provide zero ammonia slip and 99+% $NO_x$ removal with a system reliability so improved that the maintenance interval can be increased to over five years.

Whereas, the devices and methods have been described in relation to the drawings and claims, it should be understood that other and further modifications, apart from those shown or suggested herein, may be made within the spirit and scope of this invention.

What is claimed is:

1. A multi-bed selective catalytic reduction system for use in removing toxic elements from combustion waste streams, comprising:
    a waste stream gas input duct;
    a plurality of ammonia injection grid assemblies and a plurality of selective catalytic reduction catalyst assemblies, ordered such that each ammonia injection grid assembly is immediately followed by a selective catalytic reduction catalyst assembly, all located downstream from said gas input duct; and
    an exhaust stack located downstream from said plurality of ammonia injection grid assemblies and plurality of selective catalytic reduction catalyst assemblies.

2. The multi-bed selective catalytic reduction system of claim 1 wherein the plurality of ammonia injection grid assemblies and plurality of selective catalytic reduction catalyst assemblies comprise:
    a first ammonia injection grid assembly located downstream from said gas input duct;
    a first selective catalytic reduction catalyst assembly located downstream from said first ammonia injection grid assembly;
    a second ammonia injection grid assembly located downstream from said first selective catalytic reduction catalyst assembly;
    a second selective catalytic reduction catalyst assembly located-downstream from said second ammonia injection grid assembly.

3. The multi-bed selective catalytic reduction system of claim 1 further comprising a distribution grid located between said gas input duct and said plurality of ammonia injection grid assemblies and plurality of selective catalytic reduction catalyst assemblies.

4. The multi-bed selective catalytic reduction system of claim 1 further comprising a silencer in said exhaust stack.

5. The multi-bed selective catalytic reduction system of claim 1 further comprising a plurality of air intake ducts located between said gas input duct and said plurality of ammonia injection grid assemblies and plurality of selective catalytic reduction catalyst assemblies.

6. The multi-bed selective catalytic reduction system of claim 5 further comprising a plurality of fans in fluid communication with said plurality of air intake ducts.

7. The multi-bed selective catalytic reduction system of claim 5 further comprising a plurality of dampers located adjacent said plurality of air intake ducts.

8. The multi-bed selective catalytic reduction system of claim 3 further comprising a plurality of air intake ducts located upstream from said distribution grid.

9. The multi-bed selective catalytic reduction system of claim 8 further comprising a plurality of fans in fluid communication with said plurality of air intake ducts.

10. The multi-bed selective catalytic reduction system of claim 8 further comprising dampers located adjacent said plurality of air intake ducts.

11. The multi-bed selective catalytic reduction system of claim 1 further comprising a carbon monoxide catalyst assembly located downstream from said gas input duct.

12. A method of removing toxic elements from a combustion waste stream comprising:
    allowing a combustion waste stream comprising one or more toxic elements to enter a multi-bed selective catalytic reduction system;
    removing toxic elements from said combustion waste stream by passing said combustion waste stream through a first ammonia injection grid assembly and then a first selective catalytic reduction catalyst assembly located within said multi-bed selective catalytic reduction system;
    removing more toxic elements from said combustion waste stream by passing said combustion waste stream through a second ammonia injection grid assembly and then a second selective catalytic reduction catalyst assembly located within said multi-bed selective catalytic reduction system; and
    allowing said combustion waste stream to exit said multi-bed selective catalytic reduction system through an exhaust stack.

13. The method of claim 12 further comprising axially distributing said combustion waste stream by passing said combustion waste stream through a distribution grid before passing said combustion waste stream through said first ammonia injection grid assembly.

14. The method of claim 12 further comprising adding tempering air to said combustion waste stream prior to passing said combustion waste stream through a carbon monoxide catalyst assembly by allowing tempering air to enter said multi-bed selective catalytic reduction system through a plurality of air intake ducts located upstream of said carbon monoxide catalyst assembly.

15. The method of claim 14 further comprising forcibly adding tempering air to said combustion waste stream through the use of a plurality of fans in fluid communication with said plurality of air intake ducts.

16. The method of claim 14 further comprising controlling the amount of tempering air added to said combustion waste steam through the use of dampers located adjacent said air intake ducts.

17. The method of claim 13 further comprising adding tempering air to said combustion waste stream prior to passing said combustion waste stream through said distribution grid by allowing tempering air to enter said multi-bed selective catalytic reduction system through a plurality of air intake ducts located upstream of said distribution grid.

18. The method of claim 17 further comprising forcibly adding tempering air to said combustion waste stream through the use of a plurality of fans in fluid communication with said plurality of air intake ducts.

19. The method of claim 17 further comprising controlling the amount of tempering air added to said combustion waste stream through the use of dampers located adjacent said air intake ducts.

20. The method of claim 12 further comprising removing carbon monoxide from said combustion waste stream by passing said combustion waste stream through a carbon monoxide catalyst assembly located within said multi-bed selective catalytic reduction system.

* * * * *